United States Patent
Hammerschlag

[19]

[11] Patent Number: 5,802,780
[45] Date of Patent: Sep. 8, 1998

[54] CONSTRUCTION SYSTEM WITH PRE-MANUFACTURED HOLE PATTERNS

[76] Inventor: Peter G. Hammerschlag, 220-111th Ave. SE., Bellevue, Wash. 98004

[21] Appl. No.: 966,687

[22] Filed: Nov. 10, 1997

Related U.S. Application Data

[63] Continuation of Ser. No. 263,875, Jun. 22, 1994.

[51] Int. Cl.⁶ .............................. B23Q 1/01; A63H 33/10; A47B 97/00; E04C 3/00
[52] U.S. Cl. .......................... 52/105; 52/653.1; 52/655.1; 52/693; 52/646; 446/113; 403/200; 403/231; 411/546; 411/378; 411/367; 411/427
[58] Field of Search .............................. 52/105, 633, 646, 52/653.1, 655.1, 656.1, 648.1, 651.1, 693; 446/111, 113, 108; 403/200, 231; 411/546, 547, 378, 395, 367, 427

[56] References Cited

U.S. PATENT DOCUMENTS

| | | |
|---|---|---|
| 973,144 | 10/1910 | Staples ................................. 411/378 X |
| 1,860,627 | 5/1932 | Sherman ................................ 446/113 |
| 2,152,189 | 3/1939 | Henderson ................................ 52/693 |
| 2,632,533 | 3/1953 | MacKenzie . | |
| 3,355,837 | 12/1967 | Pedersen . | |
| 3,396,996 | 8/1968 | Raptis ................................. 411/424 X |
| 3,648,426 | 3/1972 | Chaudhary . | |
| 3,814,416 | 6/1974 | Munger et al. . | |
| 3,845,604 | 11/1974 | Ottoson ................................. 403/23 X |
| 3,884,002 | 5/1975 | Logie .................................... 403/23 X |
| 3,999,350 | 12/1976 | McKenzie . | |
| 4,261,665 | 4/1981 | Hsiung ................................... 403/231 |
| 4,389,808 | 6/1983 | Podell et al. . | |
| 4,620,747 | 11/1986 | Lemmon . | |
| 5,437,135 | 8/1995 | Witte ......................................... 52/693 |

FOREIGN PATENT DOCUMENTS

| | | | |
|---|---|---|---|
| 659874 | 2/1987 | Switzerland .................... A47B 97/00 |
| 0387469 | 2/1933 | United Kingdom .................... 411/367 |

*Primary Examiner*—Robert Canfield

[57] ABSTRACT

A construction system having structural members with pre-manufactured rows of holes for fastening. A first kind of structural member (33, 35 and 35a in FIG. 2) has a row of holes equally spaced at a distance N. A second kind of structural member for diagonal bracing (43 in FIG. 2) has a row of holes equally spaced at a distance equal to the length of the hypotenuse of a right triangle with the other two sides having a length of N or a multiple of N. A third kind of structural member (24 in FIG. 2) has two rows of holes equally spaced at a distance N, with the holes of one row perpendicularly intersecting the holes of the other row. Large diameter fasteners (60 in FIG. 8), with a cross-hole for a crossing fastener, allow mounting two or more structural members at the same longitudinal disposition to perpendicular sides of a structural member of the third kind.

8 Claims, 10 Drawing Sheets

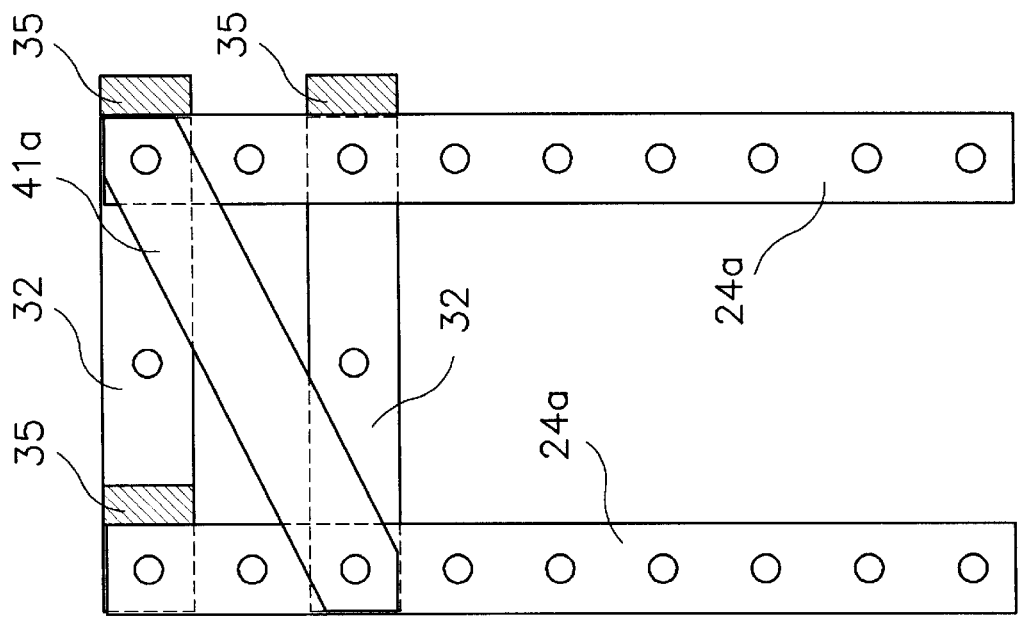
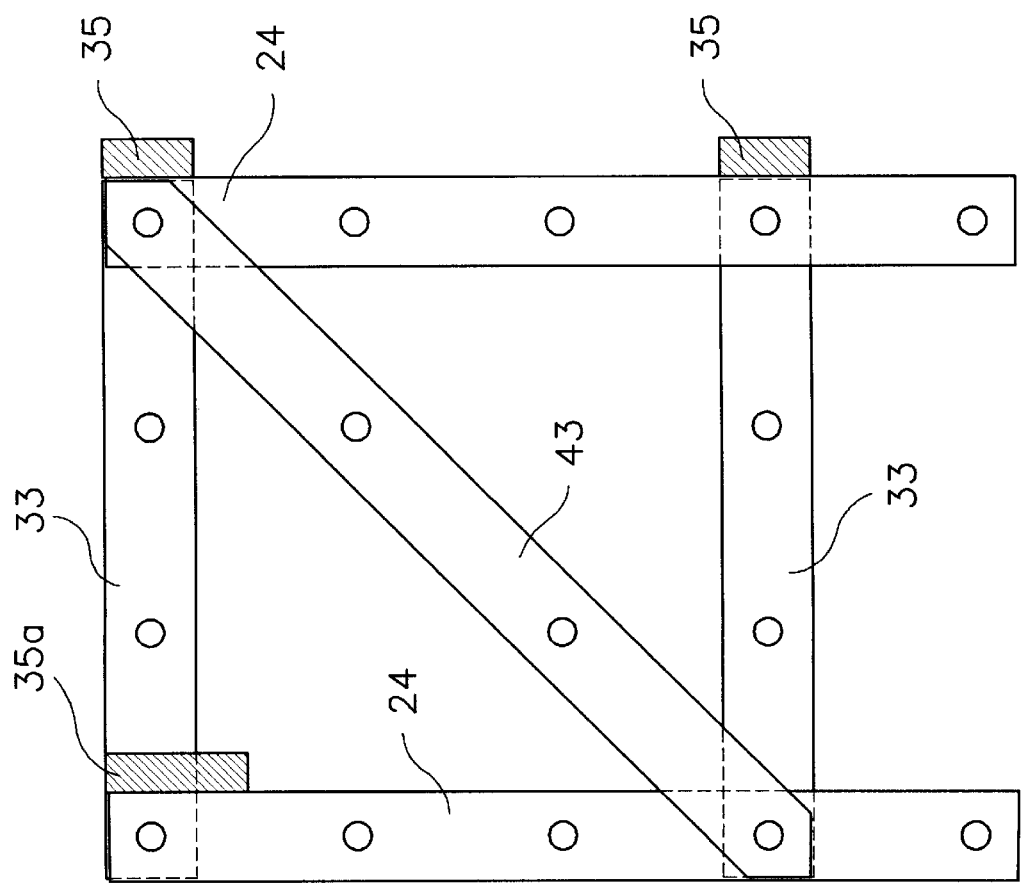
FIG. 3-B
FIG. 3-A

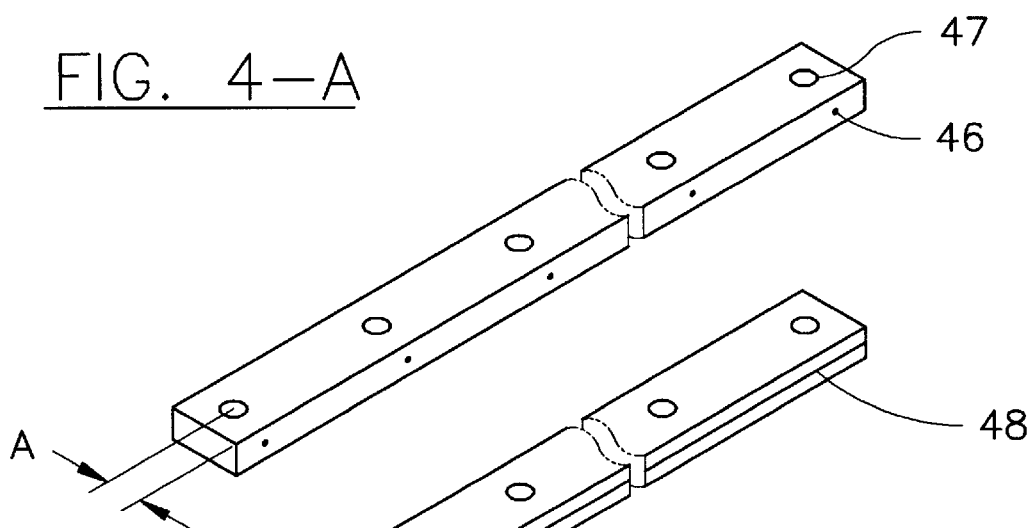
FIG. 4-A
FIG. 4-B
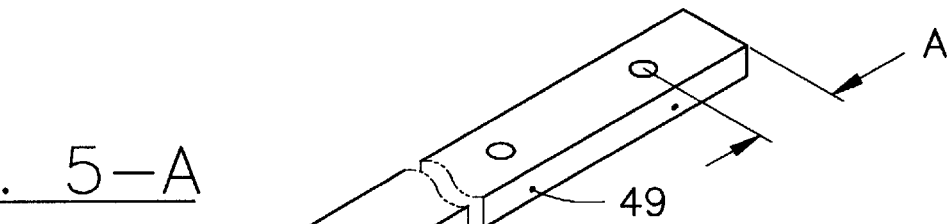
FIG. 5-A
FIG. 5-B

CONSTRUCTION SYSTEM WITH PRE-MANUFACTURED HOLE PATTERNS

This application is a continuation application of prior application Ser. No. 08/263,875, filed on Jun. 22, 1994.

BACKGROUND OF THE INVENTION

This invention relates to construction systems which use structural members with premanufactured rows of holes. The user selects or cuts the appropriate lengths of members and fastens them together using the holes closest to the desired joint points. The fasteners are usually bolts and nuts.

Such systems allow fast creation of customized structures without having to use manufacturing methods which require substantial equipment and/or special skills. The structures can also be taken apart again easily and the components re-used for other structures.

One of the main advantages and time savers of such a system is that a minimum of design is needed. One can start putting something together with only an approximate sketch of what is needed, and take it apart again, or modify it, if not satisfactory, without wasting material.

If the holes are made in large quantity in an industrial environment, it can also be done more accurately and at less cost, than is possible at home, at an outside job site or in a shop set up for another type of activity.

The potential of this concept has intrigued inventors for a long time, and a number of such systems have been developed. They are however often limited in what they allow to construct, lack strength and stiffness, are expensive and/or more difficult to use than is apparent on first sight.

The Lemmon Patent

One such system is described in U.S. Pat. No. 4,620,747 (Lemmon, 1986). It uses wood as the preferred material. FIGS. 1, 2 and 3 of the patent illustrate the basic rectangular structural member of this system and its FIGS. 9, 10, 11, 13 and 15 show various ways to construct with it. As its FIGS. 1, 2 and 3 show, the hole pattern consists of two rows of equally spaced holes, one row through the wide sides and a second row perpendicular to the first row through the narrow sides. The holes in the second row have the same hole-to-hole spacing as those in the first row, but are located intermediate of them. Thus the holes in the two rows do not intersect each other.

This system has a significant shortcoming in that it does not provide an easy way to install members perpendicular to each other in a "geometrically determined" way. "Geometrically determined" means in this context, that the members supposed to be perpendicular to each other, must be perpendicular to make the fasteners fit. The only practical way to do this with this system is to create right triangles with the two short sides having lengths of three and four hole spacings and the hypotenuse five hole spacings, or multiples thereof. Creating these "3,4,5" triangles is often awkward to do, particularly in a spatial structure. For instance, bracing the structure of FIG. 10 of above patent in all three perpendicular planes of the structure with these "3,4,5" triangles would require significant reconfiguration of the structure.

When structures as depicted in FIG. 13 of above patent, with a "spreader" member, item 67, are used, bracing with "3,4,5" triangles in a plane through the spreader member and the member it attaches to, will be impossible because of the offset between the two rows of holes in the members.

Another shortcoming of this system is encountered when using one of the members as a vertical post and mounting two other members horizontally to two perpendicular sides of the vertical member. As the two rows of holes in a member are lengthwise offset from each other, it will be impossible to mount the two horizontal members in the same horizontal plane. Thus they will not be able to support together table tops, shelf surfaces, floors, etc.

The Munger and Kirby Patent

U.S. Pat. No. 3,814,416 (Munger and Kirby, 1974) also uses structural members with two rows of holes, the holes of one row being perpendicular to and intermediate of those of the other row, like the just discussed U.S. Pat. No. 4,620,747 (Lemmon). However, instead of the "spreader" members of the latter, this system uses rods or pipes going through the fastener holes to space members a certain distance apart. See its FIG. 2, which shows such a pipe, item 30, and also shows that the members are kept in place with retaining collars, items 52 and 53, with setscrews 58 and 59.

Setscrews are, however, not capable of reliably holding any significant load and this system is therefore only usable for light-duty applications as the playground climbing structures it was developed for. Note also that in the sample structure in its FIG. 1, the inventors use the pipes with collars only in horizontal positions, in which all the significant loading is perpendicular to the pipes.

Again, due to the fact that the two rows of perpendicular holes in the members are located intermediate of each other, this system does not allow installing two beams perpendicular to each other in the same plane to the same post. Thus it is impossible for two perpendicularly mounted beams to support together the same panel. This means again that a square or rectangular table top, shelving panel or floor surface cannot be supported along its four edges.

The limitations associated with the offset between the two rows of holes bring up the question why this was done. The answer is quite simple. If the offset would not exist, we would have two rows of intersecting holes. A fastener through one hole would prevent inserting a fastener through the intersecting hole of the other row.

The Pedersen Patent

The inventor of U.S. Pat. No. 3,355,837 (Pedersen, 1967) found a solution to this problem. He uses two rows of intersecting perpendicular holes, which each have a large bore section and a small bore section. The large bore sections extend from one side past the intersection with the other hole, see FIG. 3 of the patent, allowing this way insertion of a cylindrical member shown in its FIG. 4. This cylindrical member has six threaded holes allowing fastening from all directions with bolts or threaded rods into those holes. This solution does obviously work, but it is expensive to drill all the holes in the basic members as stepped holes, while the additional cylindrical members also add to the cost and make it more laborious to install the fasteners.

In addition, the fact that two sides of the members have large diameter bores and two sides small diameter bores creates an orientation problem. The users will have to constantly think about the proper orientation when assembling, and if by accident something is assembled the wrong way, it may require a substantial disassembly to correct.

Like the previous systems, the Pedersen system can normally only provide geometrically determined perpendicularity through the use of "3,4,5" triangles, which is awkward in many situations, and requires many closely spaced holes to have sufficient versatility.

The Podell and Haner Patent

U.S. Pat. No. 4,389,808 (Podell and Haner, 1983) shows another solution allowing fasteners in perpendicular directions with centerlines crossing. It uses hollow structural members, open on one side, so that the bolts do not have to pass through the whole member, but can be inserted or provided with nuts from the inside. This appears to be a reasonable approach for the light-duty toy building sets it was developed for, but it will be very heavy, bulky and expensive if needing to take more substantial loads. Because the structural members are not tubular, but have an open side, they will be weak and flexible in torsion, unless the walls are very thick. This patent does not show any provisions for diagonal bracing.

"Slotted Angle" Patents

The most common construction system using members with premanufactured rows of holes is usually referred to as "slotted angle". It typically consists of zinc-plated steel "angles" (L-shaped members) rolled from sheet metal, with an abundance of slotted and round holes in both flanges. Their manufacturers can provide so many holes because the relatively thin sheet metal is easily punched with presses, which is an inexpensive process compared to drilling. Slotted angle is usually sold in lengths of 10 or 12 feet and cut to size by the customer with a shearing tool.

Slotted angle is awkward to use and often does not lead to good results for a number of reasons. One of them is the large number of slots and holes, in patterns whose functional rationale is often unclear. It appears that many manufacturers of this product think that the more slots and holes they provide the better it is for the customer. This makes it often unclear how to best bolt it together, as will be apparent from the following discussion of a few of the patents in this field.

U.S. Pat. No. 3,999,350 (MacKenzie, 1976) shows several configurations of slotted angle in its FIGS. 1 through 5. Its FIGS. 8 through 25 show the complexities of bolting slotted angle together. Note that FIG. 12 shows bracing with a "3,4,5" triangle as mentioned before, using the most simple variety of slotted angle of this patent.

The method typically used with slotted angle to join a post and two perpendicular horizontal beams together is shown in FIGS. 10, 13 and 20 of MacKenzie's patent. It has as a major shortcoming that the two horizontal beams are not at the same level, but offset vertically relative to each other by the flange thickness of the upper angle. This means that a table, shelving or floor panel can only be evenly supported at its four edges by adding filler strips, which not only increases cost and assembly time, but also is a very awkward operation as it is difficult to keep those filler strips in place.

U.S. Pat. No. 3,648,426 (Chaudhary, 1972) shows two more varieties in its FIGS. 1 and 3. This inventor, in contrast with the previous one, does not show how structures can be made with his invention, but particularly with the type shown in its FIG. 3, it appears that it must be complex.

U.S. Pat. No. 2,632,533 (MacKenzie, 1953) shows a more simple slotted angle configuration, including illustrations of how to use it. It also shows a gusset plate, item C in FIGS. 5 and 6, as an aid in mounting angles to each other at other angles than 90 degrees, for instance for diagonal bracing. It is shaped as a quadrant of a circular plate, with radial rows of holes. However, such a gusset plate is very awkward and time consuming to use, and allows only a very limited number of relatively small attachment bolts, under some angles only one or two per joint.

Another disadvantage of "slotted angle" construction is that sheet metal angles are not very stiff in torsion, resulting often in undesirable flexible structures. In addition, the relatively small bolts used with slotted angle, typically ¼ or 5/16 inch diameter, do not always give sufficient holding power, particularly when mounted in slots. Finally, the shearing to length, which usually goes through one or more of the holes or slots, creates ugly ends with sharp corners.

OBJECTIVES

In view of the foregoing, the objectives of this invention are to provide a versatile construction system of the type having structural members with pre-manufactured rows of holes, which:

1. Allows easy diagonal bracing for creating perpendicular relationships and providing strong and stiff structures.
2. Allows mounting two or more beams in the same plane perpendicular to each other to the same post.
3. Achieves both simplicity of assembly and modest cost by minimizing the number of holes and using only one size of through holes, without steps.
4. Allows easy modification and disassembly, with removed parts being re-usable for new structures.
5. Allows users to create accurate structures fast, by giving them structural members with highly accurate hole patterns, precut accurately to length.

Further more limited objectives will become apparent from the detailed description.

SUMMARY OF THE INVENTION

Briefly, the construction system of the present invention consists of:

three types of structural members,
three types of fastener assemblies,
spacer members, and
mounting angles.

The three types of structural members in a preferred embodiment are:

1. Posts, square in cross section, with two lengthwise rows of holes through the sides, the holes of one row perpendicularly intersecting the holes of the other row. The holes all have the same size and are equally spaced at a distance N.
2. Beams, rectangular in cross section, with a single lengthwise row of holes through the wide sides. The holes have the same size as those in the posts, and are also equally spaced at a distance N.
3. Diagonals, rectangular in cross section, with a single lengthwise row of holes through the wide sides. The holes have the same size as those in the posts and beams, but are equally spaced at a distance equal to the hypotenuse of a right triangle, with the other two sides of the triangle having a length equal to N or a multiple of N, in general terms. In practical terms, the most usable hole spacings for the diagonals will be N×√2, N×√5, N×√10 and N×√17, the hypotenuse lengths for right triangles with one short side N and the other N, 2N, 3N and 4N.

The three types of fastener assemblies are:

1. Straight-through fastener assemblies consisting for instance of bolts, solid bars threaded at both ends, or pipes threaded at both ends, with an outside diameter slightly less than the size of the holes in the structural members, which can bolt together "sandwich style" two or more structural members with the appropriate number of nuts and washers.
2. Tee fastener assemblies, which consist of a first part which is like a straight-through fastener, except that it has in addition, a threaded cross-hole, and a second part, for instance an externally threaded cross-bolt, which fastens into this cross-hole and thereby can attach one or more structural members to a post perpendicular to the structural members fastened by the first part. The structural members attached by the cross-bolt are held in the proper location by an indexing sleeve around the cross-bolt or by providing the cross-bolt with an oversize indexing shank of the same diameter as the first part.

3. Crossing fastener assemblies, which consist of a first part like the one used for the tee fasteners, except that the cross-hole may or may not be threaded, a second part, for instance an externally threaded cross-bolt, which screws into this cross-hole or passes freely through it, and is long enough that a third part, for instance a nut or an internally threaded cross-bolt can be used to attach structural members from the other side. Structural members attached by the cross-bolts or nuts are again held in the proper location by indexing sleeves or oversize indexing shanks on the cross-bolts.

The spacer members are tubular sleeves of varying length, which fit over fasteners, thereby allowing to space apart structural members while allowing full load transfer.

The mounting angles are L-shaped members which allow attaching panels and other components to structural members, using conventional fastening means.

BRIEF DESCRIPTION OF THE DRAWINGS

FIG. 3-A is a section through the workbench frame of FIG. 2, as indicated in that figure with arrows 3.

FIG. 3-B is a section through a narrower bench using a different diagonal bracing element.

FIG. 4-A shows how discrete markings can show which side of a structural member is accurately located relative to the hole centers.

FIG. 4-B shows how line marking can show which side of a structural member is accurately located relative to the hole centers.

FIG. 5-A shows how discrete off-center markings can also indicate which end is located accurately relative to the hole centers.

FIG. 5-B shows how off-center line marking can also indicate which end is located accurately relative to the hole centers.

FIG. 18 shows how the mounting angles can be used to support cross-beams such that their top surfaces are flush with those of the beams attached to.

In the figures showing assemblies the fasteners are often omitted for clarity. If that is the case it is assumed that fasteners as depicted in other figures of the drawings are used. Of course, if dowels flush with the surface are used as fasteners, the pictorial representation will be the same as when there are no fasteners in the holes.

DETAILED DESCRIPTION

Basic Structural Components and Diagonal Bracing

Figure 1:
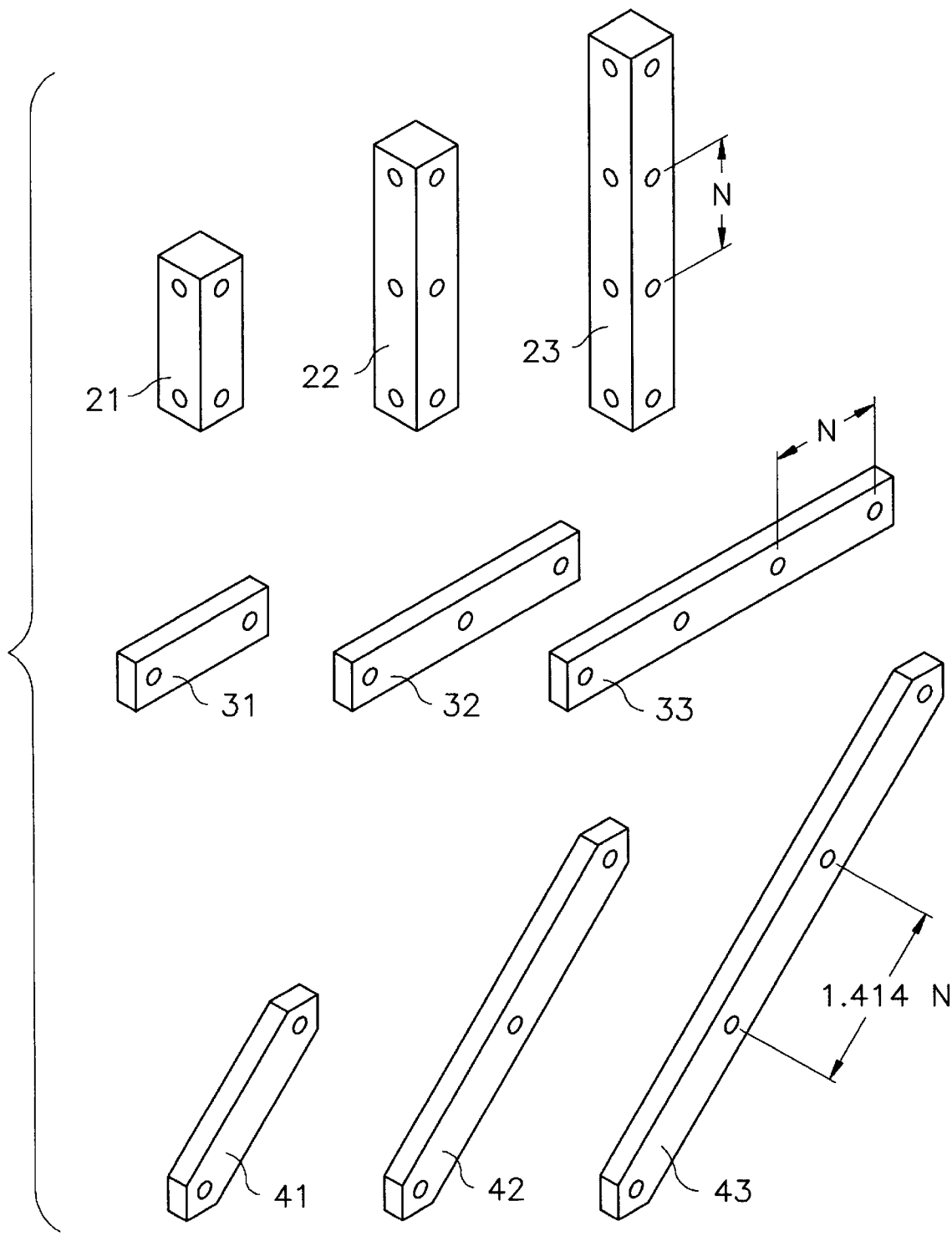
FIG. 1 shows isometric views of the three types of structural members of this invention.

FIG. 1 shows the three basic structural components or members of this construction system. They are shown in the shape they would have in the preferred embodiment, which will be discussed in more detail later in this description.

The posts 21, 22, 23 and longer ones not shown, have two lengthwise rows of holes through the sides, the holes of one row perpendicularly intersecting the holes of the other row. Also, the holes all have the same diameter and are equally spaced at a hole-center to hole-center distance N. N is a basic hole spacing chosen for the specific application of the construction system. The posts are primarily intended to be vertical supports, but can also be used in other orientations.

The beams 31, 32, 33 and longer ones not shown, have a single lengthwise row of holes through the side. The holes have the same diameter as those in the posts and are equally spaced at the same hole-center to hole-center distance N. The beams are primarily intended to be horizontal ties between posts, and to be supports for horizontal surfaces, like table tops, shelving panels, floors, etc., but can also be used in other orientations.

This construction system uses several types of diagonals, which have, like the beams, a single lengthwise row of holes through the side. The holes have the same diameter as those in the posts and beams. Each type of diagonal has its own hole-center to hole-center distance for a specific bracing angle. This hole-center to hole-center distance equals the length of the hypotenuse of a right triangle with one side adjacent the right angle having a length N and the other side adjacent the right angle having a length N, 2N, 3N or 4N. Hole spacings based on the hypotenuse of right triangles with one or both of the short sides equal to a larger multiple of N are also possible, but unlikely to be practical, except for very special situations.

A first type of diagonal, based on a right triangle with both sides adjacent the right angle having a length N is shown in FIG. 1. The diagonals 41, 42, 43 and longer ones not shown, have their holes equally spaced at a hole-center to hole-center distance equal to N times the-square-root-of-two, that is 1.414 times as far apart as those in the posts and beams. These diagonals are primarily intended to brace structures by being positioned under angles of 45 degrees with posts and beams, but can also be used in other orientations. Their ends can be cut square like the beams, but for reasons discussed later the pointed end configuration shown is preferred.

A second type of diagonal, based on a right triangle with the sides adjacent the right angle having lengths of N and 2N, has a hole-center to hole-center distance equal to N times the-square-root-of-five, that is 2.236 times as far apart as those in the posts and beams. This allows to diagonally brace structural member sections of a length N to sections of a length 2N, or multiples thereof, thus with bracing angles of 26.565 and 63.435 degrees, but these diagonals can also be used in other orientations. The shape of their ends will also be discussed later.

Similarly, diagonals for bracing under different angles, based on different right triangles are possible.

Thanks to the fact that the diagonals of the first type have a hole spacing which is the-square-root-of-two times as large as that of the posts and beams, it is extremely easy to diagonally brace a structure with them. A two-hole diagonal will brace a two-hole beam section to a two-hole post section, a three-hole diagonal will brace a three-hole beam section to a three-hole post section, etc.

Figure 2:
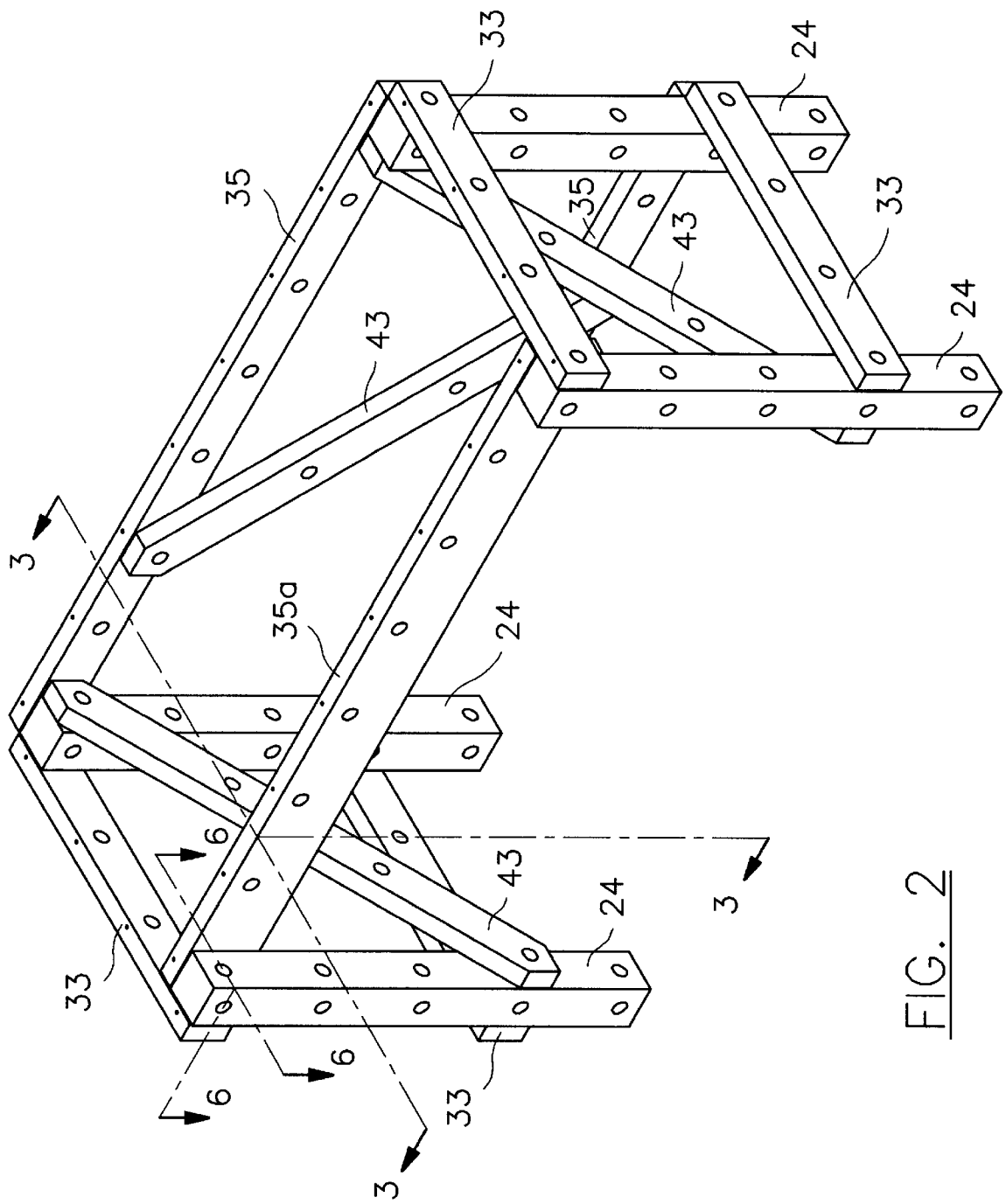
FIG. 2 is an isometric view of a workbench frame constructed using a preferred embodiment of the invention.

This is illustrated in FIG. 2, which shows how a simple workbench frame can be constructed with this system. It consists of four 5-hole posts 24, tied together horizontally by four 4-hole beams 33, two 8-hole beams 35, and a special 8-hole beam 35a, and diagonally braced with three 4-hole diagonals 43. The special beam 35a, which will be discussed later, can be replaced by a standard beam 35. Note that the two diagonals on the sides brace the structure by creating triangles, while the one in the back creates trapezoids. The latter is somewhat less stiff than the former, because it relies on the ability of the beams connected by the brace to resist bending, but it is completely satisfactory for many situations.

FIG. 3-A shows a section through the workbench of FIG. 2. Arrows 3 in FIG. 2 indicate where the section is taken. Note that the intermediate holes of the diagonals line up horizontally and vertically with the holes in the posts and beams and thus allow mounting additional members in horizontal or vertical position, by fastening to posts and diagonals or beams and diagonals. Because the two members connected this way are not always in the same plane, it may require the use of spacers, for instance in the form of bushings around the fasteners.

FIG. 3-A also illustrates why a 90 degree pointed end configuration for the diagonals is preferred. As can be seen in the top right corner, it eliminates interference with beam 35 and the top panel, which is not shown, but would rest on top of beam 33. (See FIG. 17 for an illustration of an example top panel mounting.) If the end of the diagonal would be cut square short enough to not cause these interferences, there would not be enough material left around the hole. Note also that the distance from the last hole in a post or beam to the end, and from the last hole in a diagonal to the two surfaces of a pointed end, are slightly less than the distance from the hole to the side of the member attached to, so that inaccuracies in manufacturing will not cause interferences.

FIG. 3-B shows a section similar to FIG. 3-A through a narrower version of the workbench of FIG. 2, which uses a diagonal 41a of the second type. Note that the pointed ends of this diagonal are asymmetric, such that the point-forming end cuts are parallel to, or perpendicular to, the sides of the members the diagonal is attached to.

A feature of this system which can be of benefit in certain situations is that it is possible to use the diagonals in two perpendicular directions, for instance horizontal and vertical, and use beams and/or posts to brace them diagonally.

For certain situations it would also be desirable to provide some structural members with extra holes intermediate of the basic holes, e.g. hole-center to hole-center spacings of 1/2N, 1/3N, 1/4N, etc. in posts and beams. FIG. 3-B shows as an example posts 24a, which have additional holes such that the hole-center to hole-center spacing is 1/2N. This could for instance be of value if the intent is to use the holes in the posts also to mount shelves or drawers.

For other situations it might be desirable to increase the hole-center to hole-center spacing to a multiple of the basic hole-center to hole-center spacing. These larger hole spacings could for instance be of value to reduce the manufacturing cost of structural members intended for use on larger structures.

All rows of holes in the structural members can extend over their full length or only part of their length. In addition it is possible to provide one or more other holes, not related to this system, for other purposes, for instance to attach other components, or to be part of another construction system.

The holes in the structural members do not necessarily have to be round, but they can for instance also be square, hexagonal, octagonal, serrated, splined or of another multi-sided shape. Such shapes can also be alternated with each other and with the round holes, as long as their size is the same. "Size" is defined for this purpose as the diameter of round holes or the diameter of the largest circle which fits inside a multi-sided hole shape. Providing multi-sided holes can have merit where combination with another construction or fastening system using such holes is desired.

Some or all of the holes can also be elongated or slotted, in which case the "size" of the hole for the purposes of this system will be again the diameter of the largest circle which fits inside the elongated or slotted hole. Generally speaking however such elongated or slotted holes will not be desirable for this system, as they reduce the ability to install structural members perpendicular to each other in a "geometrically determined" way, as discussed in the "Background of the Invention" section of this specification. However, for special situations they may have merit, for instance when combining with other construction or fastening systems, particularly if such other systems would provide means to secure the fasteners in a centered or pre-determined off-center position, thus retaining the feature of geometric determination.

Though most applications of this system are expected to be three-dimensional structures, like the workbench frame of FIG. 2, there will also be situations where using it for a two-dimensional structure has merit. This could for instance be situations where a structure is attached to an already existing structure. An example would be a special wall structure for mounting ventilation or other equipment, attached to an existing wall.

Cross Section of Structural Components

The cross section of the posts can have any shape which allows the two rows of perpendicularly intersecting holes. Thus it can for instance be square, rectangular, octagonal, other multi-sided with the number of sides a multiple of four, angle, channel and even round and elliptical shapes. These cross sections, except angles and channels, can be solid or tubular. Similarly the beams and diagonals can have any cross-sectional shape which allows a single row of holes.

However, for many applications, square and rectangular cross sections, solid or tubular, are preferred for the following reasons:

1. They create large contact surfaces between clamped together structural members compared to multi-sided with eight or more sides, round and elliptical cross sections. These large contact surfaces cause large frictional resistance against rotation of one structural member relative to the adjacent one around a connecting fastener, and thus increase the strength and stiffness of a structure.

2. The symmetry of square and rectangular cross sections makes assembly easier compared with non-symmetric cross sections like angles and channels. Square and rectangular cross sections present a solid and flat mounting surface on all four sides and there are no flanges in the way of another piece to be mounted as can be the case with angles and channels. The latter require substantial thinking with regard to their orientation and give a lesser number of options for attachment.

3. Closed tubular members are much stiffer in torsion than open channels and angles. This stiffness in torsion is also a feature of "solid" wood, which has a tubular fiber structure.

Though both rectangular and square cross sections can be used for the posts, square is the preferred shape because it means that no thinking has to be done with regard to orientation of narrow and wide faces. Also, the loading of posts usually is in compression and buckling strength is optimum for the square cross section.

For the beams and diagonals a rectangular cross section with the row of holes through the wide sides is optimum. They will often be fastened sandwich style to posts and being thinner in the direction of fastening will create a less bulky structure and allow shorter fasteners. Since they have only one row of holes, making them rectangular will not add any orientation problems.

Preferred Embodiment

The workbench frame of FIG. 2 is an example of the use of the preferred embodiment for typical projects using square posts and rectangular beams and diagonals as just discussed. The rows of holes are centered in the sides of the posts, beams and diagonals, except for the special beam 35a, which will be discussed later. It uses wood, to be specific 4×4 lumber (standardized at 3½×3½ inch cross section) for posts and 2×4 lumber (standardized at 1½×3½ inch cross section) for beams (except beam 35a) and diagonals. These lumber sizes are available in most lumber yards in the U.S.A. and Canada. The hole diameter D is 1³⁄₃₂ inch for fasteners 1.050 inch diameter. The fasteners will be discussed in more detail later in this description. The spacing N between hole centers in the posts and beams is 8 inch. The spacing between hole centers in the first type of diagonals is thus 8 times the-square-root-of-two=11.314 inch and between hole centers in the second type of diagonals 8 times the-square-root-of-five=17.889 inch.

The posts, beams and diagonals can be provided in long lengths, for instance 8 feet or 12 feet, and can be cut to length by the users, or they can be precut. Precutting the structural members is a real convenience for the users, as it reduces greatly the work they have to do to put a structure together. In an industrial environment, allowing the use of advanced machinery, special tools and fixtures, it can also be done more accurately and at lower cost than is possible with hand tools at home, at an outside job site or in a shop set up for another type of activity. Precutting is practical for this construction system because the number of holes is minimized and thus the number of possible length options is not very large.

The minimized number of holes has also another significant advantage for the users. It reduces the group of components the user can choose from—for the size range of structure contemplated—to a small enough number to not get confused and to be able to make a quick decision which components to use. In the relatively few cases where a very specific dimension is needed, not provided for by the system, the next larger size standard precut members can be taken and cut to size for this special situation.

When precutting, it is, as mentioned before, preferable to cut the posts such that the distance from the center of the last hole to the end is slightly less than half the beam width, so that the post ends don't interfere with a table top panel, shelving panel, floor panel or the like, supported by the beams.

Similarly, as mentioned before, the ends of the beams are preferably cut so that the distance from the center of the last hole to the end is slightly less than half the post width, so that the beam ends do not interfere with other beams or diagonals mounted perpendicular to them to the same post at the same level.

The ends of the 45 degree diagonals are preferably cut in a 90 degree pointed shape, as discussed before, with the distance from the center of the last hole to one of the point-forming surfaces being slightly less than half the beam width and to the other point-forming surface slightly less than half the post width. (See FIG. 3-A, top right corner.) In this preferred embodiment, where standard beam width and post width are the same, this results in symmetrical ends for the diagonal. This is a preferred shape as it eliminates thinking about what the correct orientation is. Thus, if beam and post widths are not the same, it is preferable to make the diagonal ends symmetrical anyway, with the distances from the center of the last hole to both point-forming surfaces being equal, and slightly less than half the lesser of the beam width and the post width.

A look at FIG. 3-B makes it obvious that it is not very well possible to make the ends of the second type of diagonal symmetrical. For maximum strength around the end hole, the end cuts have to be parallel with or perpendicular to the sides of the members attached to, as shown. However, since it is also obvious when they are mounted the wrong way around, this asymmetry is not a problem.

Note that FIGS. 2, 3-A and 3-B show posts, beams and diagonals which are all cut to length in the manner discussed in the previous paragraphs.

Note also that the pointed ends of the diagonals, together of course with their larger hole spacing, distinguish them very well from the beams, even if made from the same lumber size. This makes assembly easier and faster, as a quick look already reveals what a structural member's intended use is.

The sizes given for the preferred embodiment of this invention are for general application. Larger scale applications, for instance for use in construction or bridge building, as well as smaller scale applications, for instance for instrumentation setups, model building and toys, are possible.

Location of Holes for Maximum Accuracy

The just discussed preferred embodiment, which uses 4×4 lumber for posts and 2×4 lumber for standard beams and diagonals, has the rows of holes centered in the faces of those components. As those faces are nominally 3½ inch wide, the rows of holes are nominally 1¾ inch from the edges.

Unfortunately, lumber manufacturing methods are quite inaccurate and deviations from the nominal dimensions up to about ⅛ inch are common.

Therefore, a preferred way of manufacturing the holes is to locate them exactly 1¾ inch from one of the edges instead of centering them in the faces. This will allow to support table top panels, shelving panels, floor panels, etc. evenly, by positioning the "accurate" sides of the supporting members towards those panels.

Lumber manufacturing methods also fail to produce consistently straight lumber and bows up to about ¼-inch in 12-foot lengths are common. Placing the holes exactly 1¾-inch from one of the edges implies that the rows of holes follow the curvature of the lumber. This may not appear right on first sight, because it can create assembly problems. However, it is the best solution, because lumber is fairly flexible and can therefore be bent quite easily into shape. Thus, for instance, when installing diagonals, if the holes for the fasteners do not exactly line up, the curved members, particularly the beams, can be bent into shape. The diagonals will then actually force them into a straighter position.

To facilitate assembly of structural members with the "accurate" surfaces (accurately located relative to the holes) facing a certain direction, it is beneficial to have those surfaces identified by markings or "indicia". For situations where a member may be cut into smaller sections, it is desirable to do the marking such that this information is not lost for one or more of the cut pieces. This can be done by placing discrete indicia on or near the accurate surface at each hole location. See FIG. 4-A, where "the accurate distance is indicated with the letter "A" and" dots 46 are placed in front of the holes 47. Such dots can have a variety of shapes, for instance round, elliptical, square, rectangular, polygon, star, line segment and others. Such indicia can be stamped on, applied with stickers, they can be indentations or they can be created using other marking techniques.

Another way of marking would be to place a line lengthwise on or near the accurate surface, substantially extending at least over the length of the associated row of holes. Such a line can be continuous, dotted, dashed or be of another type. FIG. 4-B shows "the accurate distance indicated again with the letter "A" and" a line 48 scribed along the accurate surface.

For certain applications, the holes are also placed an accurate distance from one of the ends. Ends are often more difficult to mark than sides, but it is possible to indicate which is the accurate end by placing the markings or indicia which indicate the accurate side off-center. See FIG. 5-A, "where the accurate end distance is indicated with the letter "A" and where" like in FIG. 4-A, discrete indicia 49 are placed on the accurate surface at each hole location, but off-center. FIG. 5-B shows "the accurate end distance indicated again with the letter "A" and" a line 50 scribed similarly off-center along the accurate surface. If this approach is taken it will be necessary to adhere to a convention (or rule). For instance: "When the member is laid down horizontally with the indicia closest to the bottom (as shown in FIGS. 5-A and 5-B), when facing those indicia, the accurate end is at the right hand side".

Wide Structural Members

In the preferred embodiment previously discussed 2×4 lumber was used for the standard beams. Where long beams which can carry significant loading are desired, 2×4 lumber may not have enough strength and wider beams should be used. With regard to the preferred location of the row of holes in these wide beams, on first sight, centered in the sides as in the 2×4 beams, appears best. This would reduce the weakening of the beams to a minimum as the central part of a beam in bending contributes least to its strength. However, it was found that for certain applications it is more practical to locate the row off-center, exactly 1¾ inch from one of the edges as in the 2×4 beams. This way these wider beams can be combined with the narrower 2×4 beams to support a table, shelving, floor or other panel.

For instance, in the workbench frame of FIG. 2, the top long beam 35a in front is shown as a wide beam made from 2×6 lumber, with an off-center row of holes as just discussed. The edge which is an accurate 1¾ inch from the hole centers is located upward. The top panel would thus still be supported by beams along all four edges.

The upper beams 33, 35 and 35a in FIG. 2, which will support the top panel, are shown there with discrete markings, as discussed in the previous section, facing upward, and thus indicating to the user that a flat support for the top panel is present, provided that the beams do not have too much curvature. The latter problem can be handled by selecting straight beams. Though not obvious on first sight, this turned out to be a very doable approach for the following reasons. First of all it is easy to determine straightness by looking lengthwise along a structural member. Second, as a considerable number of beams will normally be used in places where some curvature is not objectionable (for instance the lower beams in the workbench frame of FIG. 2), and straightness of lumber is statistically a rather random property, such selection does not create an excessive number of unusable pieces.

Figure 15:
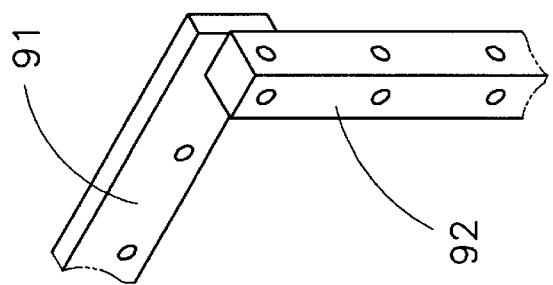
FIG. 15 is an isometric view of a wide beam with an off-center row of holes attached to a post.

These wider beams with rows of holes located off-center turned out to be also very convenient for railings, when mounted with the edge closest to the holes downward. They stick this way out above the posts and thus hands can slide over them without hitting the posts. See FIG. 15 which shows a 2×6 beam 91, with an off-center row of holes, attached to a 4×4 post 92.

Fasteners—General

The preferred fastening method for construction systems, using pre-manufactured rows of holes, has been bolts and nuts, primarily because they are strong and reliable fasteners, which can be easily assembled and disassembled with common handtools.

Bolting is also the preferred method for this system, but there are other fastening methods which may be preferred for certain situations. Rivetting can be a good method, particularly when joining metals, for instance when vibrations are present, which can cause bolts and nuts to come loose. Dowels can be a good method, particularly in wood, for instance when a flush appearance is desired. Snap-in devices can be useful, for instance for non-load-carrying cover plates which have to be easily removable for access purposes.

Concept for "Tee" Fastener Assemblies

As discussed in the section on the background of the invention, using regular bolts and nuts creates a problem in the posts. If one bolt is inserted, it becomes impossible to insert a second bolt in the crossing hole.

This construction system resolves this problem by increasing the diameter of the first bolt a substantial amount, so that the second bolt can be screwed into a threaded cross-hole in the first bolt, creating a "tee" fastener assembly. To maintain versatility, prevent orientation problems, and minimize manufacturing costs, all the holes in the structural members are increased to this larger size, a little larger than the outside diameter of the first bolt, which in the following will also be called the "straight-through" fastener. To assure that the piece attached by the second smaller diameter bolt is in the right place, an indexing sleeve fitting snugly in the holes is placed around the second bolt, which in the following will also be called the "crossing" fastener.

Figure 6:
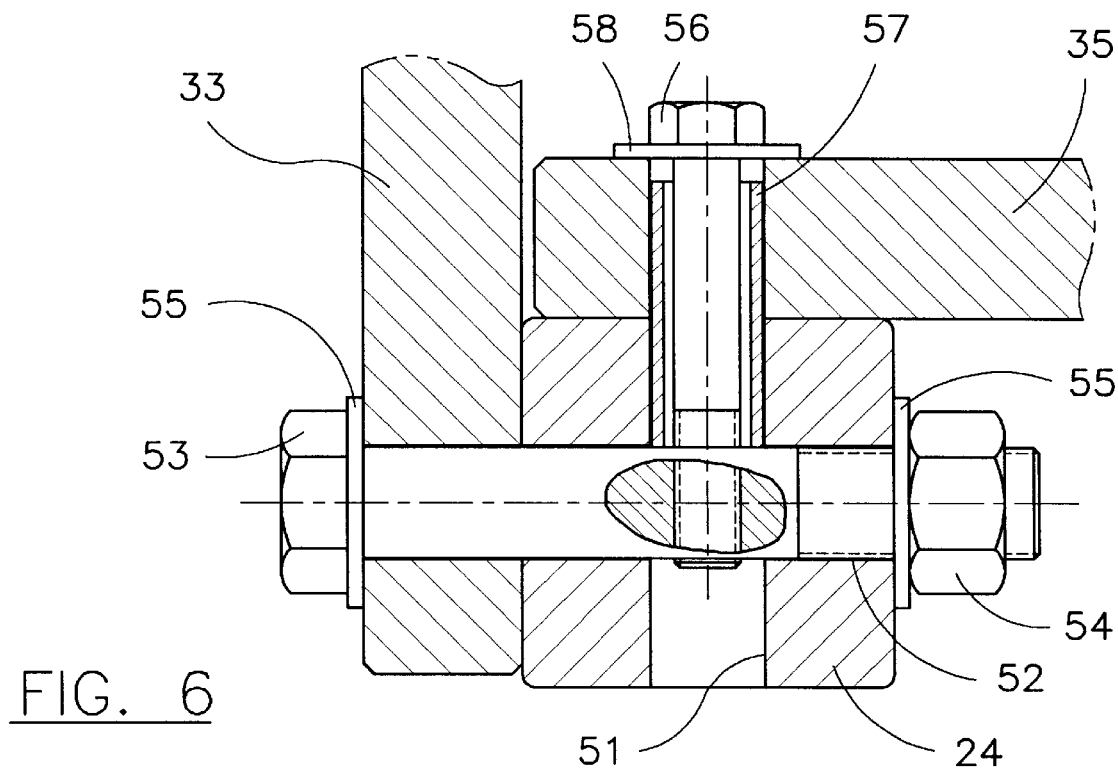
FIG. 6 is a section through a post of the workbench frame of FIG. 2, as indicated in that figure with arrows 6. It shows how a tee fastener assembly can attach two beams or other structural members perpendicular to each other to the post.

See FIG. 6, which shows a horizontal section through the top of the left front post in FIG. 2, as well as the two beams attached to it, as indicated in that figure with arrows 6. The section shows the intersecting holes of equal diameter, 51 and 52, the straight-through bolt 53, assembled with nut 54, and optional washers 55, the smaller diameter cross-bolt 56 with washer 58, and the indexing sleeve 57, which has the same outside diameter as bolt 53. As cross-bolt 56 has a considerably smaller diameter than the hole 51 it passes through, the washer 58 is needed or, alternatively, the cross-bolt has to be provided with an oversize head or an integral washer of sufficient size.

Note that there is a gap between the outside diameter of bolt 56 and the inside diameter of sleeve 57. This gap is essential, because it allows a certain amount of shift of bolt 53, and thus the cross-hole in it, relative to hole 51 in post 24, in a direction parallel to the centerline of bolt 53. Such a shift is inevitable due to manufacturing inaccuracies in the thickness of beam 33, in the distance from the centerline of hole 51 to the side of the post 24 touching beam 33, the location of the cross-hole in bolt 53 relative to the shoulder of its head, and the thickness of washer 55 under the head.

Alternate Tee Fastener Assemblies

Figure 7:
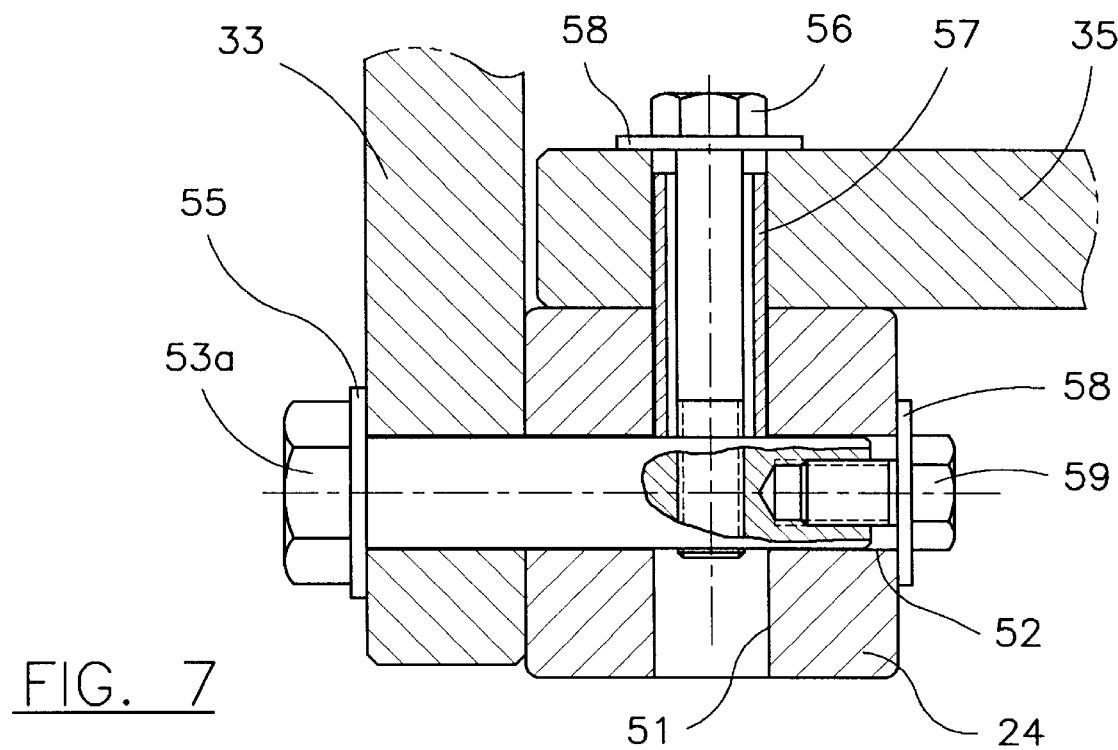
FIGS. 7, 8 and 9 are sections similar to FIG. 6 showing different tee fastener configurations.

FIG. 7 shows a tee fastener configuration which is identical to the one of FIG. 6, except that it uses a bolt 53a which has internal threads at its end, and a screw 59, instead of the nut 54, to fasten the components together. As this screw 59 has again a considerably smaller diameter than the hole 52 it passes through, a washer 58 will be required or, alternatively, screw 59 will have to be provided with an oversize head or an integral washer of sufficient size. Except for length, screw 59 can have the same dimensions as screw 56, as shown. The advantage of this configuration is that the end of bolt 53a does not protrude out of post 24. Thus it would be possible to slide parts at assembly along post 24, past an already installed bolt 53a, and install the screw 59 later, or omit it, if not needed for load-carrying purposes. In the latter case it would of course also be possible to use, instead of bolt 53a, a bolt which does not have the internal threads at its end, but is simply cut off after the cross-hole.

In both the configuration of FIG. 6 and FIG. 7 it will be desirable to align the centerline of the cross-hole parallel with two opposing wrench flats on the bolthead. At assembly this will help positioning the cross-hole in the right direction for installing cross-bolt 56. The bolthead will of course not necessarily have to be hexagonal in shape as shown, but can also be square or be of any other wrenchable shape.

Figure 8:
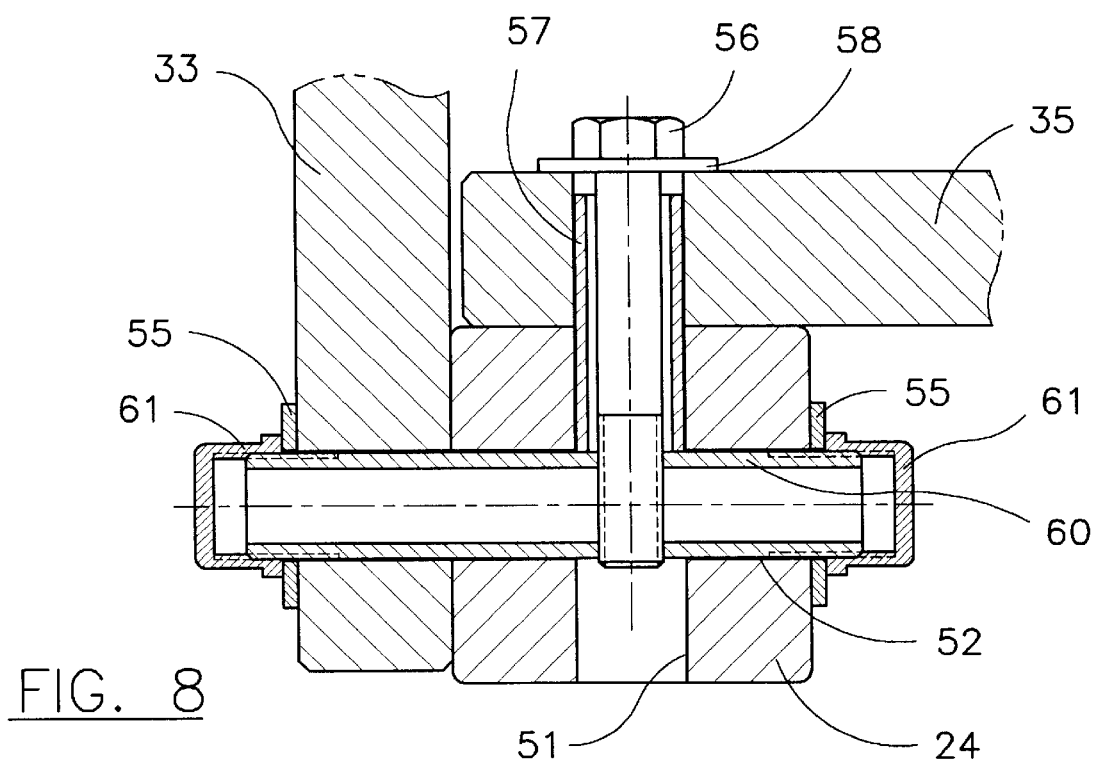

Bolts 53 in FIG. 6 and 53a in FIG. 7, due to their large diameter, will be much stronger than needed for many applications, particularly when made from steel, and joining members made from a soft material like wood. These bolts will also be quite expensive. An alternate lower strength and lower cost tee fastener configuration is shown in FIG. 8. The bolt is here replaced by a simple piece of pipe 60, which is externally threaded at both ends. Two nuts 61 are screwed on the ends for fastening. These nuts are shown as "acorn" or "cap" nuts, giving a more finished look and more protection of the threads, for instance in a corrosive environment, but they can of course also be hex nuts as shown in FIG. 6 or have any other suitable shape.

An additional advantage of the tee fastener configuration of FIG. 8 is that it can accommodate a much larger amount of the previously discussed shift of the cross-hole location due to manufacturing inaccuracies, than the configurations of FIGS. 6 and 7. This is so, because, in the absence of a fixed bolt head shoulder, the pipe fastener 60 can be shifted axially until the cross-hole is approximately back in the center of hole 51. In essence, one of the nuts functions as a bolthead whose distance to the cross-hole is variable.

Even though wrenching surfaces on pipe fastener 60 are not really needed for assembly, they can help speeding up assembly, particularly if such wrenching surfaces are aligned with the cross-hole and thus can help position the cross-hole in the right direction. There are many ways to provide such wrenching surfaces. One way would be to increase the length of pipe fastener 60 at one or both ends and provide wrench flats on the added section or sections, such that the nuts can pass over them. Another way would be to provide internal wrenching flats in the hole through the fastener. This could for instance be done by making the hole through pipe fastener 60 not round, but square, hexagonal or of another multi-sided shape.

Figure 10:
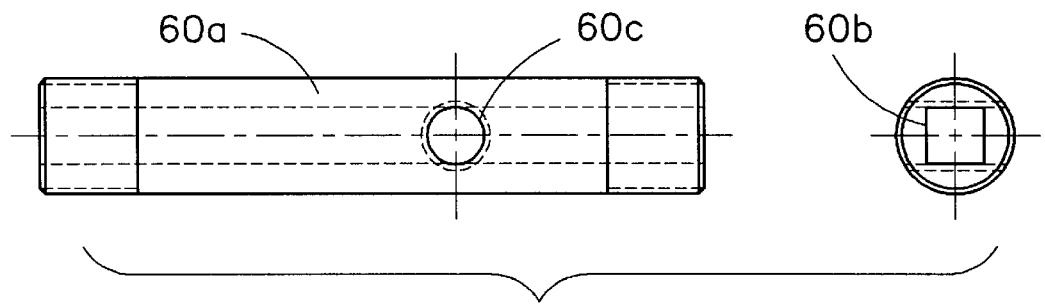
FIG. 10 shows a side view and an end view of an optional fastener configuration for the fastener assembly of FIG. 8.
Figure 11:
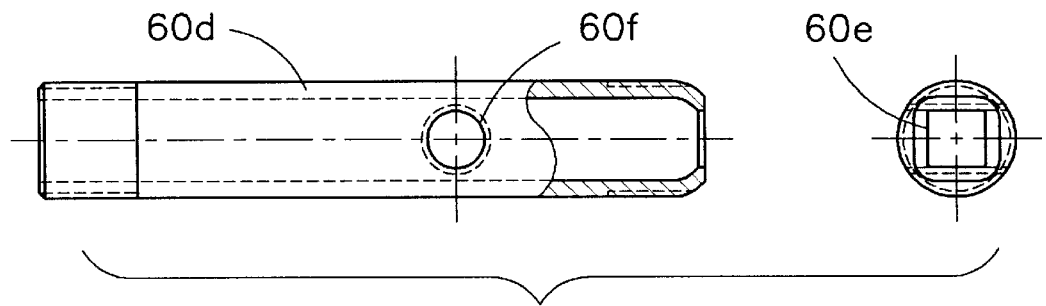
FIG. 11 shows another optional fastener configuration.

FIG. 10 shows a side view and an end view of a fastener 60a which has a square hole 60b through the fastener and a cross-hole 60c aligned parallel to two opposing flats of the square hole. A fastener of this shape can be made quite easily from plastic or from a special aluminum extrusion with a square hole. Another solution, more suitable to steel, is shown in FIG. 11. The fastener 60d is here made from standard "schedule 80" pipe, with one of the ends being deformed to create the square hole 60e, which has flats that are aligned with the cross-hole 60f. Naturally, the other end of the fastener can also be provided with such a square hole.

Figure 9:
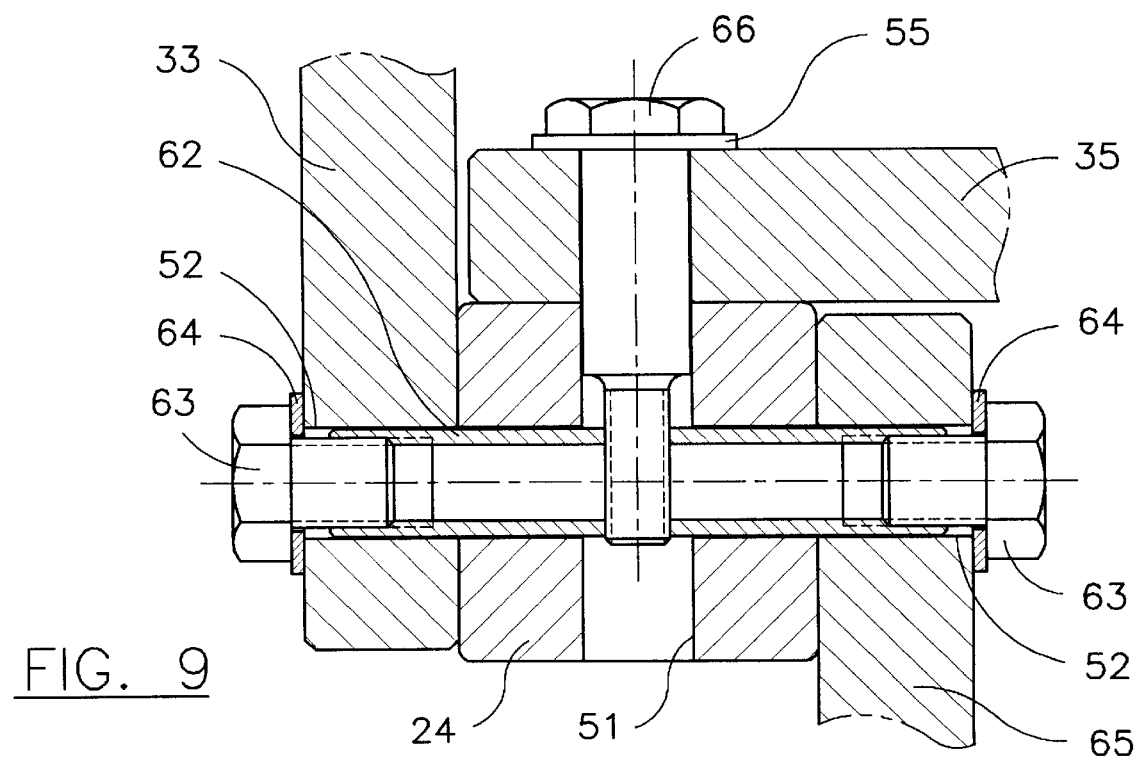

Still another tee fastener configuration is shown in FIG. 9. The large diameter fastener 62 consists here of a piece of pipe threaded at the ends internally instead of externally. Two externally threaded screws 63 engage with these ends to hold the joined members together. Again, since these screws are considerably smaller in diameter than the holes 52 they are passing through, washers 64 are needed, or the screws have to be provided with oversize heads or integral washers of sufficient size. Like the configuration of FIG. 7, this option has as advantage that fastener 62 does not protrude beyond the fastened structural members and thus it can be installed before other components are slid into place along those members.

FIG. 9 also shows another option for the cross-bolting. Instead of the separate cross-bolts 56 and indexing sleeves 57 of FIGS. 6,7 and 8, a cross-bolt 66 is used, which combines both parts. It has the same threaded portion as bolt 56, but its shank section is increased in size to the same diameter as the indexing sleeve. Of course combining these two parts eliminates the possibility of accommodating manufacturing inaccuracies by positioning cross-bolts and indexing sleeves eccentric to each other. As discussed, the configurations of FIGS. 8 and 9 can accommodate manufacturing inaccuracies also by shifting the pipe fasteners 60 and 62 respectively, thus do not need this capability. However, the configurations of FIGS. 6 and 7 do need it, and can therefore not use this one-piece indexing cross-bolt concept. The advantages of the one-piece indexing cross-bolt are the lesser number of parts, and thus faster assembly, while it also eliminates the possibility of accidentally forgetting to install the sleeves. The elimination of a part by creating a double-function part also creates savings by eliminating the administrative and inventory costs associated with carrying a part in inventory.

For special situations it will also be possible to use a hybrid tee fastener configuration which uses a piece of pipe which has external thread at one end, and internal thread at the other end. For other special situations it would be possible to provide the piece of pipe with both external and internal threads at one or preferably then both ends. This would give the user more freedom to decide while building a structure how to put it together. If the external threads are used for making an initial structure, the internal threads will be available later to add additional structure or other components, without having to partially or completely disassemble the initial structure.

Vote that FIG. 9 also shows how a third structural member 65 can be attached to a post by using a longer fastener 62, as compared with the length of the corresponding fasteners in FIGS. 6, 7 and 8.

"Crossing" Fastener Assemblies

Figure 12:
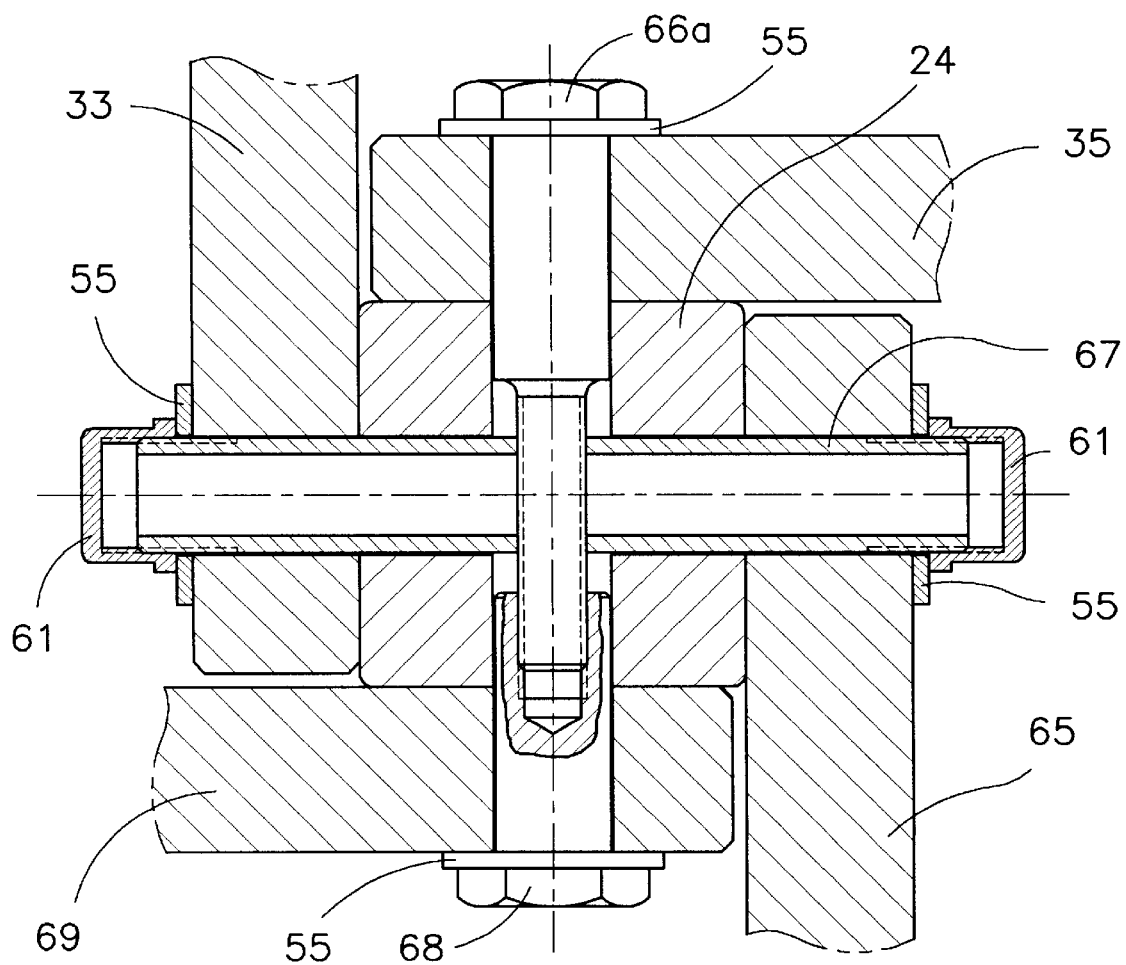
FIG. 12 is a section through a post showing a crossing fastener assembly attaching four structural members to the four sides of the post.

FIG. 12 shows how this fastening concept can be further expanded to mount four structural members to the four sides of a post, creating a "crossing" fastener assembly. The cross-bolt 66a is identical to the cross-bolt 66 in FIG. 9, except that it has an extended threaded section, protruding a significant distance out of the straight-through fastener 67. An internally threaded bolt 68, with an outside diameter equal to that of the shank of fastener 66a, thus also able to act as an indexing device, is then screwed onto this extension to fasten a fourth structural member 69. The cross-hole in part 67 can be threaded as shown in FIG. 12, but it can also be an unthreaded through hole, allowing cross-bolt 66a to pass through it freely. This is possible because the two cross-bolts 66a and 68 can fasten against each other, without needing support in part 67.

Figure 13:
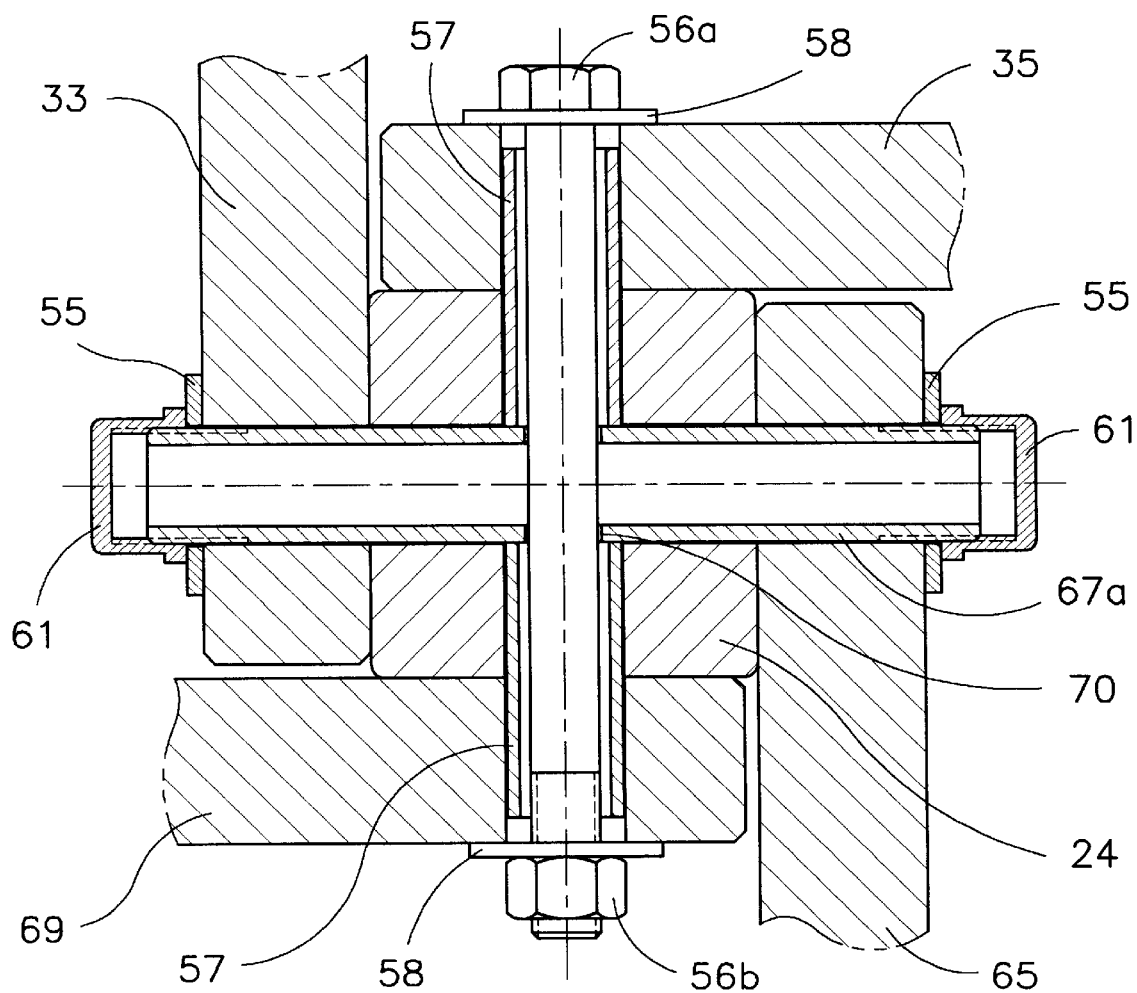
FIG. 13 is a section similar to FIG. 12 showing a different crossing fastener configuration.

FIG. 13 shows a different crossing fastener configuration, which uses a single cross-bolt 56a, of conventional shape, thus having a shank of approximately the same diameter as the outside diameter of the thread, with a nut 56b and two washers 58, and two separate indexing sleeves 57.

For special situations it will be possible to use the crossing fastener configurations of FIGS. 12 and 13 to mount only two or three structural members to a post, thus use them as tee fasteners. To accomplish this it is only necessary to shorten the fasteners where a structural member is omitted.

Fasteners—Miscellaneous Notes

It will be possible, with all fastener configurations, straight-through, tee, as well as crossing, to mount more than one structural member to a side of a post, by using longer fasteners.

It is not necessary to make fasteners 60 in FIG. 8, 62 in FIG. 9, 67 in FIG. 12 and 67a in FIG. 13 tubular, as shown. They can be solid bars, and if fasteners are made from plastic or another low-strength material this can be a very good solution, as it provides more thread in the cross-hole.

For the preferred embodiment using 4×4 and 2×4 lumber discussed earlier, the tee fastener configuration of FIG. 8 has been used. The large diameter fasteners have been made from ¾ inch nominal size pipe (standardized at 1.050 inch outside diameter), externally threaded with ¾ inch nominal size pipe thread. The cross-bolt size used is ⅝ inch. These fastener components are readily available from many hardware stores in the U.S.A. and Canada.

Construction with Spacers

Besides making the just discussed cross-bolting arrangements possible, the large diameter fasteners of this construction system also allow, in combination with spacer tubes which fit over them, to space structural members (posts, beams and diagonals), a significant distance apart and still provide a stiff and strong structure.

Figure 14:
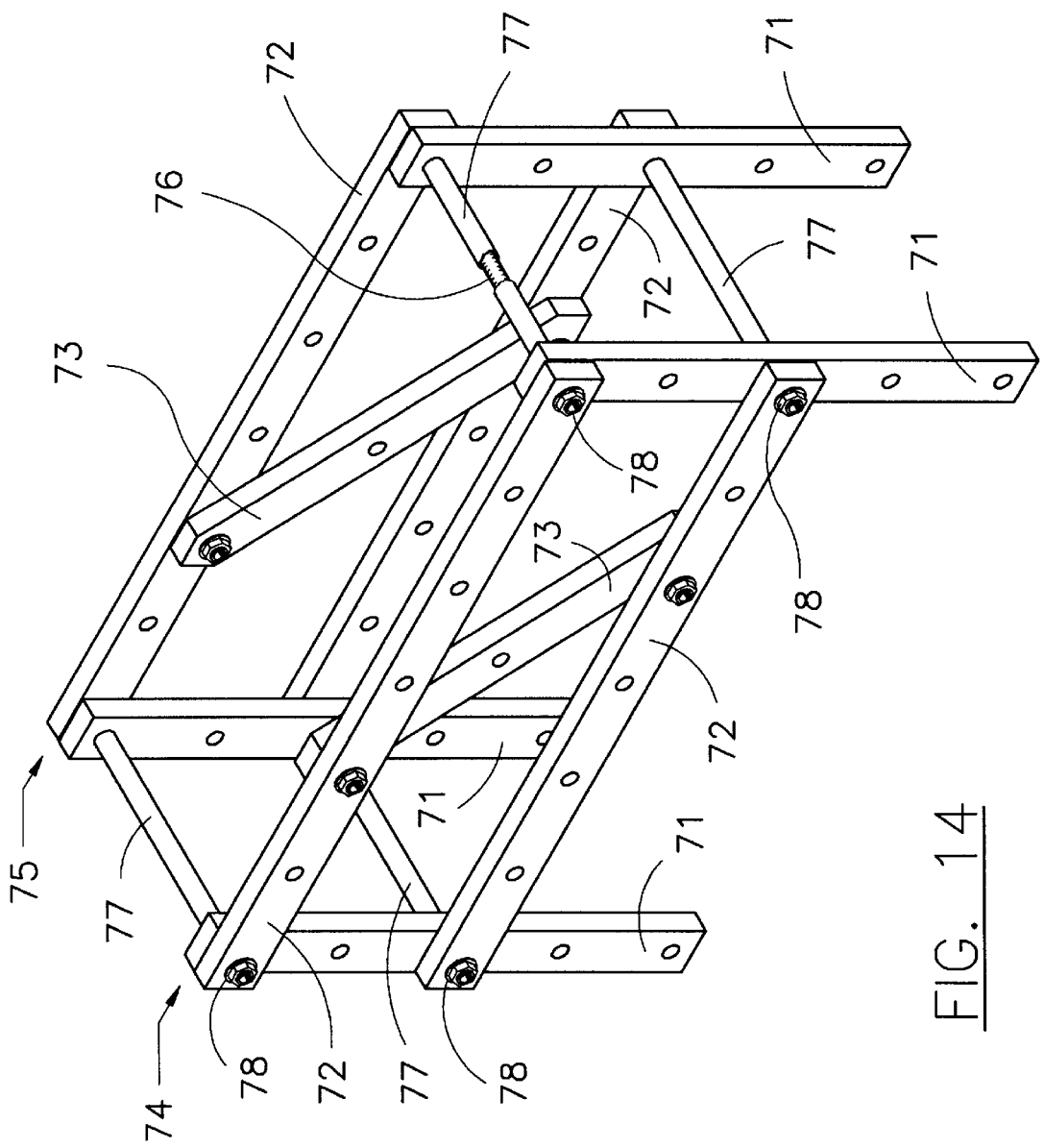
FIG. 14 is an isometric view of a small workbench frame constructed using long fasteners with spacers.

A simple four-legged table frame construction using spacer tubes is shown in FIG. 14. It uses four 5-hole beams 71, four 7-hole beams 72 and two 3-hole diagonals 73 to create two braced rectangular sides, 74 and 75. These are then tied together by four fasteners 76 with four spacer tubes 77 and eight nuts 78. (One of the spacer tubes 77 is partially broken away in FIG. 14 to show the fastener 76 inside it.)

Note that this use of the construction system allows constructing three-dimensional structures without posts having two rows of perpendicularly intersecting holes. Instead beams can be used as posts. This design also has more flexibility in changing the depth of the structure than the construction with two-row posts shown in FIG. 2, because the fasteners and spacers can easily be made in different lengths, whereas the structure of FIG. 2 can be changed in depth only in 8 inch increments. Of course this spacer design is not as strong and stiff as the structure of FIG. 2, but for quite a few applications, particularly smaller structures, it is completely adequate.

Mounting Angles

In many cases it will be necessary to mount to a structure panels (table tops, shelves, floor surfaces, wall surfaces, etc.) or other items which will not transfer much loading to the fasteners attaching them. Those situations do not warrant the large diameter and somewhat more expensive fasteners used for the basic structure of this construction system. At the same time it will often be desirable to fasten those items with "blind" fasteners, instead of "through" fasteners, so that the side away from the structure is smooth, without protruding fasteners.

Figure 16:
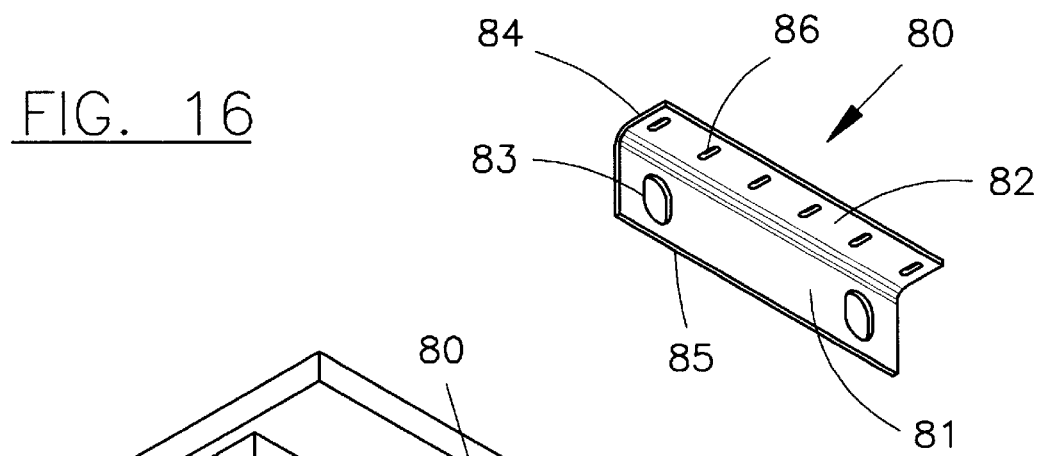
FIG. 16 is an isometric view of a mounting angle.

This can be accomplished with this construction system by using special mounting angles, made for instance from steel or aluminum. See FIG. 16, which shows an isometric picture of such an angle 80, consisting of two perpendicular flanges 81 and 82. Flange 81 has a row of two or more equally spaced slotted holes 83 with a width approximately equal to the diameter of the holes in the beams. These holes are slotted in a direction perpendicular to the length direction of the angle. The spacing between the centers of the slots is equal to the spacing between the holes in the beams.

Figure 18:
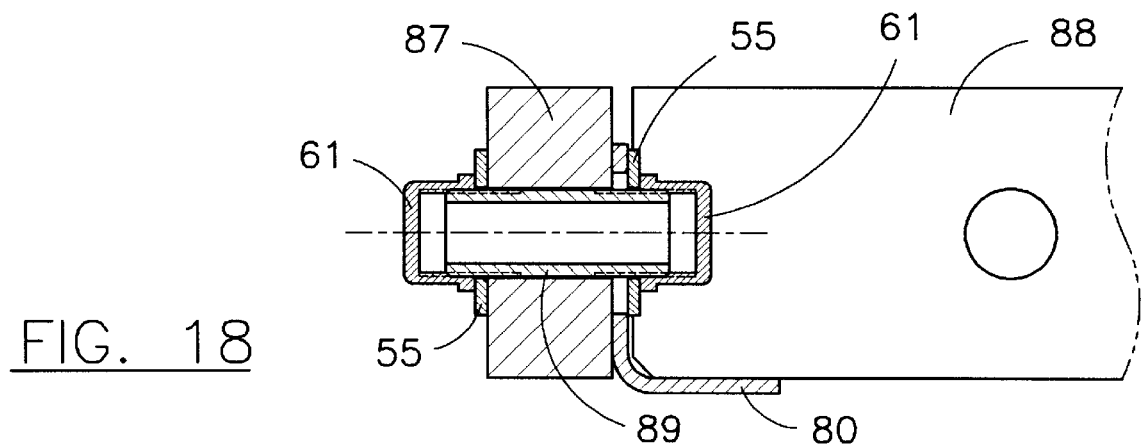

The distance from the centers of the slots 83 to the outside surface 84 of flange 82 can be any distance desired, but for the common situation of mounting panels it preferably is the distance from the centers of the holes in the beams to the edge of the surface to which the panel is to be mounted. In the preferred embodiment using 2×4 lumber for the beams this would be 1¾ inch. It is also desirable that the length of slotting towards edge 85 is somewhat more than the thickness of flange 84, so that the mounting angles can also be used to support beams in the manner shown in FIG. 18. Mounting angle 80 is here attached to beam 87 with two or more straight-through fasteners 89, each with two cap nuts 61 and two washers 55, at a level which allows it to support beam 88 such that its top surface is flush with that of beam 87 and those two beams can for instance support together a panel.

Flange 82 (see FIG. 16 again) has also slotted holes with the direction of slotting perpendicular to the length direction of the angle. Their width and spacing however will normally be different than for the slots in flange 81, to be compatible with other types of fasteners, for instance wood screws or smaller diameter bolts and nuts.

Figure 17:
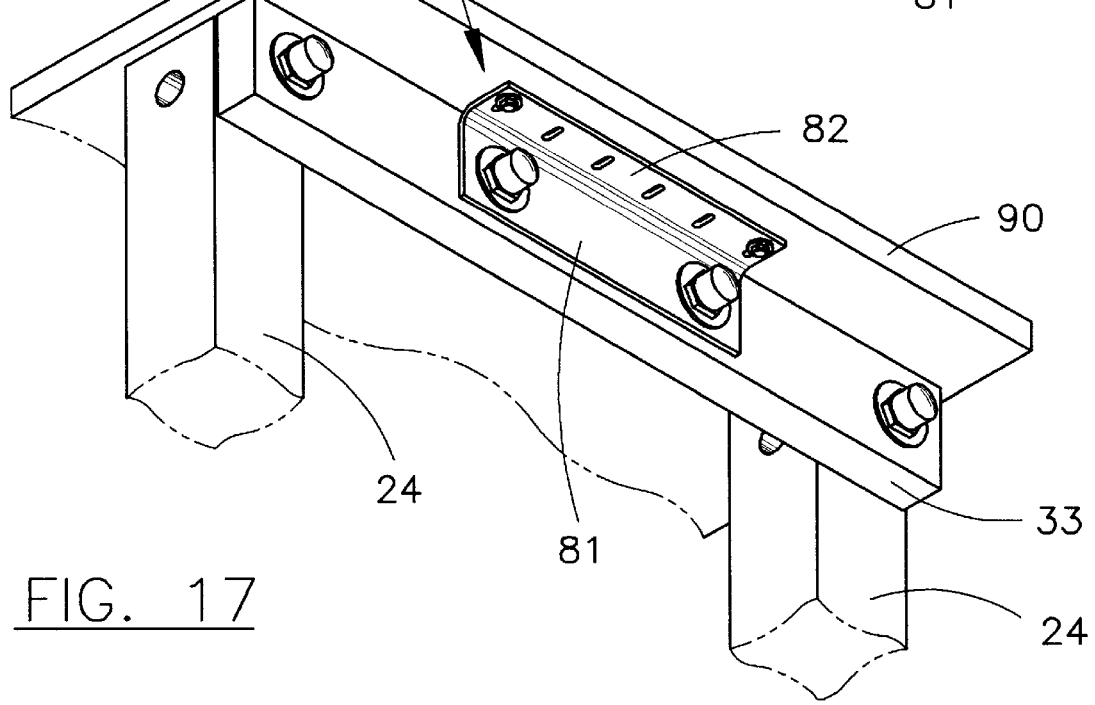
FIG. 17 is an isometric view showing how the mounting angles can be used to attach panels to structural members.

FIG. 17 shows how these mounting angles 80 can be used to mount a top panel 90 to the beams 33 of a workbench frame (similar to the frame of FIG. 2), from the bottom, with wood screws which do not protrude through the panel ("blind" fastening). The slotting of the large holes in flange 81 will assure that the panel 90 can always rest on the beams 33, in spite of manufacturing inaccuracies. The slotting of the small holes in flange 82 will assure that the wood screws can enter predrilled holes in the top panel, in spite of the substantial manufacturing inaccuracies typical for lumber. As with the other components of this construction system, this mounting angle is designed to allow accurate predrilling of all fastener holes at a modest cost in an industrial environment, such that quick assembly can be accomplished.

General Remark

While the invention has been mostly described and illustrated herein with reference to the preferred embodiment thereof, it will be understood by those skilled in the art that various changes in form and details may be made therein, without departing from the spirit and scope of the invention.

What is claimed is:

1. A construction system having structural members with pre-manufactured rows of equally spaced holes of the same size, and fastening means which connect those structural members together by passing through a selection of those holes, wherein the improvement comprises the combination of:

(a) structural members of a first kind, each having a row of holes, those holes all having substantially the same size, with adjacent holes being equally spaced at a hole-center to hole-center distance N, wherein N is a basic hole spacing chosen for a specific application of the construction system, and (b) structural members of a second kind, each having a row of holes, those holes all having substantially the same size as the holes in said structural members of a first kind, with adjacent holes equally spaced at a hole-center to hole-center distance S different from N and selected from the group consisting of: $N \times \sqrt{2}$, $N \times \sqrt{5}$, $N \times \sqrt{10}$ and $N \times \sqrt{17}$, said structural members of the first and second kinds being joinable together into a structure with the fastening means passing through a selection of the holes, such that the structure comprises structural frames selected from the group consisting of:

(1) right angle triangular shaped frames with structural members of the first kind forming the two short sides of those triangular frames and a structural member of the second kind forming the hypotenuse of the triangular frames and (2) square or rectangular shaped frames with structural members of the first kind forming the four sides of said frames and a structural member of the second kind connecting two parallel sides of the frames, such that said square or rectangular shaped frames are divided into trapezoids.

2. A construction system having structural members with pre-manufactured rows of equally spaced holes of the same size, and fastening means which connect those structural members together by passing through a selection of those holes, wherein the improvement comprises the combination of:

(a) structural members of a first kind, each having a row of holes, those holes all having substantially the same size, with adjacent holes being equally spaced at a hole-center to hole-center distance N, wherein N is a basic hole spacing chosen for a specific application of the construction system, and (b) structural members of a second kind, each having a row of holes, those holes all having substantially the same size as the holes in said structural members of a first kind, with adjacent holes equally spaced at a hole-center to hole-center distance S different from N and selected from the group consisting of: $N \times \sqrt{2}$, $N \times \sqrt{5}$, $N \times \sqrt{10}$ and $N \times \sqrt{17}$, said structural members of the first and second kinds being joinable together into a structure with the fastening means passing through a selection of the holes, such that the structure comprises structural frames selected from the group consisting of:

(1) right angle triangular shaped frames with structural members of the first kind forming the two short sides of those triangular frames and a structural member of the second kind forming the hypotenuse of the triangular frames and (2) square or rectangular shaped frames with structural members of the first kind forming the four sides of said frames and a structural member of the second kind connecting two parallel sides of the frames, such that said square or rectangular shaped frames are divided into trapezoids, wherein the construction system further comprises:

(c) structural members of a third kind, which replace one or more of the structural members of the first kind in said structural frames, said structural members of a third kind comprising:

(1) a first row of equally spaced holes, with substantially the same size and the same hole-center to hole-center distance N as the row of holes in the structural members of a first kind, (2) in addition, a second row of equally spaced holes, with substantially the same size and the same hole-center to hole-center distance N as said first row of holes, but oriented such that the centerlines of said second row of holes perpendicularly intersect the centerlines of said first row of holes, (d) fastening assemblies insertable in a pair of intersecting holes in the structural members of a third kind, said fastening assemblies comprising:

(1) a first fastening member, which has a cross-sectional shape and size-such that it closely fits in the holes, has end means which allow it to fasten one or more structural members of the first, second and/or third kind to structural members of the third kind, and has a threaded cross-hole, and (2) a second fastening member which has a threaded distal portion of a smaller cross-section that can screw into the threaded cross-hole of the first fastening member, and a shank portion with a larger cross-section that closely fits in the holes, and thus can fasten structural members of the first, second and/or third kind to a structural member of the third kind in an orientation perpendicular to a structural member fastened by the first fastening member.

3. The construction system of claim 2, (a) wherein the shank portion of the second fastening member has a cross-sectional size approximately the same as the threaded part of the second fastening member, and (b) further comprising a sleeve engageable over the shank portion of the second fastening member, said sleeve having an outside cross-section sized to closely fit in the holes of the structural members fastened together by said second fastening member.

4. The construction system of claim 2, wherein the first fastening member has at one or both ends a tubular shape, said tubular shape having internally a square cross-section, oriented rotationally around the centerline of said first fastening member such, that two opposing parallel sides of said square cross-section are parallel to the centerline of the threaded cross-hole in said first fastening member.

5. The construction system of claim 3, wherein the first fastening member has at one or both ends a tubular shape, said tubular shape having internally a square cross-section, oriented rotationally around the centerline of said first fastening member such, that two opposing parallel sides of said square cross-section are parallel to the centerline of the threaded cross-hole in said first fastening member.

6. The construction system of claim 1, 2, 3, 4 or 5, wherein one or more of the structural members of the first, second or third kind comprises a group of four substantially flat sides in a substantially square or rectangular cross-sectional relationship to each other, with at least one row of holes arranged substantially along a line parallel to or coinciding with the lengthwise centerline of one of said sides, and in which:

(a) the centerlines of the holes of such a row are located accurately a specific distance from a second side, which is one of the two sides, of said group of four sides, which are perpendicular to the side the holes are in, and (b) indicia are provided on or near said second side to indicate that it is the side to which said holes are accurately located.

7. The construction system of claim 6, wherein the indicia comprise a discrete shape selected from the group consisting of round, elliptical, square, rectangular, polygon, star and line segment, with an indicia of the selected shape being placed near each hole on or near said second side.

8. The construction system of claim 6, wherein the indicia comprise a line selected from the group consisting of continuous lines, dotted lines, dashed lines and lines comprising both dots and dashes, with the selected line being placed lengthwise on or near said second side, said selected line extending substantially over a length corresponding to the length of said row of holes.

* * * * *